(12) United States Patent
Bhattacharjya et al.

(10) Patent No.: US 10,389,735 B1
(45) Date of Patent: Aug. 20, 2019

(54) AUTOMATED CONVERSION OF NETWORKED APPLICATIONS TO READ-ONLY NETWORKED APPLICATIONS

(71) Applicant: c/o BITGLASS, INC., Campbell, CA (US)

(72) Inventors: Anoop Kumar Bhattacharjya, Campbell, CA (US); Anurag Kahol, Los Altos, CA (US); Sowmyanarayanan Krishnakumar, San Jose, CA (US)

(73) Assignee: Bitglass, Inc., Campbell, CA (US)

( * ) Notice: Subject to any disclaimer, the term of this patent is extended or adjusted under 35 U.S.C. 154(b) by 0 days.

(21) Appl. No.: 15/948,154

(22) Filed: Apr. 9, 2018

(51) Int. Cl.
*G06F 7/04* (2006.01)
*H04L 29/06* (2006.01)
*G06F 9/54* (2006.01)
*G06F 17/27* (2006.01)
*G06F 21/60* (2013.01)
*G06F 16/35* (2019.01)
*G06F 16/33* (2019.01)

(52) U.S. Cl.
CPC ............ *H04L 63/123* (2013.01); *G06F 9/543* (2013.01); *G06F 9/546* (2013.01); *G06F 9/547* (2013.01); *G06F 16/3344* (2019.01); *G06F 16/353* (2019.01); *G06F 17/2705* (2013.01); *G06F 21/604* (2013.01); *H04L 63/02* (2013.01)

(58) Field of Classification Search
CPC ........................................................ G06F 17/30
See application file for complete search history.

(56) References Cited

U.S. PATENT DOCUMENTS

| | | | | |
|---|---|---|---|---|
| 8,316,421 | B2* | 11/2012 | Etchegoyen | G06F 21/121 709/217 |
| 8,468,584 | B1* | 6/2013 | Hansen | G06Q 40/00 455/411 |
| 2003/0226036 | A1* | 12/2003 | Bivens | H04L 63/0815 726/8 |
| 2009/0241174 | A1* | 9/2009 | Rajan | G06F 21/31 726/5 |
| 2010/0146589 | A1* | 6/2010 | Safa | G06F 21/52 726/3 |
| 2013/0132518 | A1* | 5/2013 | Dashora | G06F 8/656 709/217 |
| 2018/0219863 | A1* | 8/2018 | Tran | H04L 63/10 |

* cited by examiner

*Primary Examiner* — Josnel Jeudy
(74) *Attorney, Agent, or Firm* — Wong & Rees LLP; Kirk D. Wong

(57) ABSTRACT

A proxy server converts web or networked applications that communicate with remotely located servers or other data providers, into read-only applications. The proxy server dynamically analyzes web client application requests sent by client devices and determines whether each request is human-generated or machine-generated. One or more actions are performed when a request is determined to be human-generated.

20 Claims, 5 Drawing Sheets

AUTOMATED CONVERSION OF NETWORKED APPLICATIONS TO READ-ONLY NETWORKED APPLICATIONS

The present invention relates generally to remote application security and, in particular, to securing data transferred between client devices and servers external to corporate infrastructures.

BACKGROUND

The transfer of sensitive corporate data outside of corporate-controlled infrastructures to external network accessible applications is a high security risk. For example, it is very common for employees to access external social networking web applications. These applications not only send information to the user's client device, but also attempt to obtain information from the client device, either by user input or by the application's access to the client device's information. The challenge to IT departments is to not only prevent malware from being downloaded to corporate client devices, but to prevent company and employee information from being transmitted outside of the corporate infrastructure.

Current solutions for providing IT departments with some type of security safeguards that help prevent such sensitive data transfers require a manual specification of URLs or manual configuration of methods that are used to upload data in order to enable blocking of such requests by a proxy. These manual approaches do not allow for security systems to dynamically adapt to new and differing external network accessible applications as well as changes to existing applications, e.g., adapting to new URLs that are added to an existing application, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
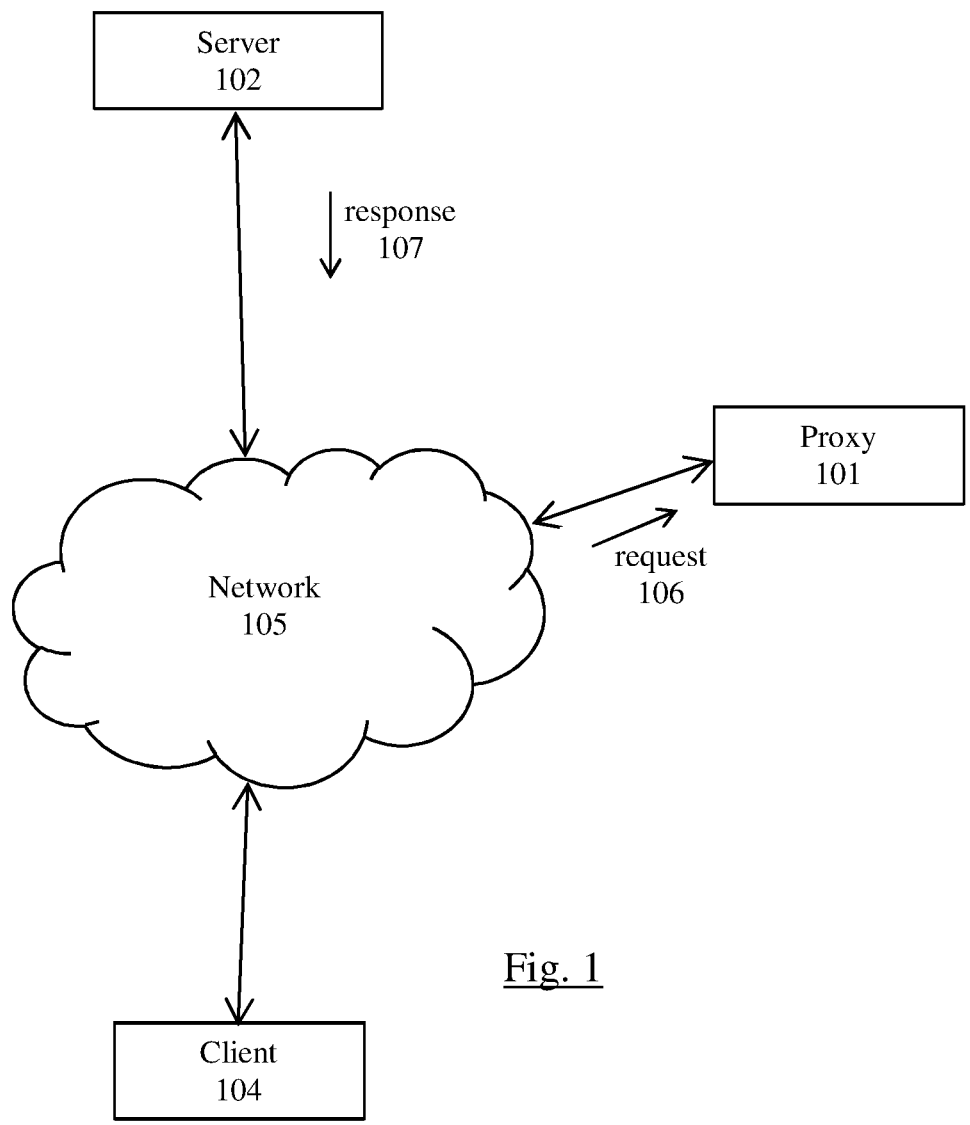
FIG. 1 illustrates a topology of a proxy system, according to an embodiment of the invention.

Example embodiments, which relate to secure applications access and data security, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. PROXY ROUTING
3. PROXY OPERATION
3.1. DEEP ANALYSIS OF TEXT FOR HUMAN VERSUS MACHINE CLASSIFICATION
4. IMPLEMENTATION MECHANISMS—HARDWARE OVERVIEW
5. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format and should be understood as merely a conceptual prelude to a more detailed description of example embodiments that follows below.

In some embodiments, remote applications (e.g., web applications, networked applications, etc.) that communicate with remotely located servers or other data providers are automatically converted into read-only applications. The advantage of a read-only application is that the transfer of data from the external servers is accepted, but the transfer of data outside of the corporate-controlled infrastructure to such servers is suppressed. An application operating in read-only mode would need to disable any uploads of user generated content to application servers.

In an embodiment, a system resides in the network path of corporate data. The system inserts a proxy between the client device and the application servers to block uploads of user data. Blocking all uploads does not achieve the desired functionality since an application often needs to upload some data as part of a request to operate normally even when it is not uploading user-created content. The proxy automatically determines requests and methods that are being used to upload user data and distinguishes between uploaded "control" inputs and "user data" inputs from the client device. The proxy blocks the latter type of inputs to ensure the security of data from the corporate-controlled infrastructure.

Various modifications to the preferred embodiments and the generic principles and features described herein will be readily apparent to those skilled in the art. Thus, the disclosure is not intended to be limited to the embodiments shown but is to be accorded the widest scope consistent with the principles and features described herein.

2. Proxy Routing

Referring to FIG. 1, a topology of a proxy system shows an overall organization of communications between a user using a client web application that communicates with application servers or other peers and data services via a proxy to deliver the application to the user. In an embodiment, a proxy 101 may essentially be in the "cloud." Communication between proxy 101, server 102, and client device 104 may occur across network 105. Note that server 102 and client device 104 are shown for ease of discussion as proxy 101 may be in communication with a plurality of servers and a plurality of client devices. Network 105 comprises, but is not limited to, any of: the Internet, intranet, local area networks (LANs), wide area networks (WANs), dedicated links, private computer networks, public computer networks, enterprise computer networks, etc. Proxy 101 may be communicatively connected with other proxies (not shown). Server 102 may be any of: an application server, other peer service on the web, data service on the web, etc.

Under normal conditions, the proxy 101 receives one or more network requests 106 from one or more client web application programs executing on the user's client device 104 and then forwards the requests to the server 102. In turn, the proxy 101 receives the response 107 from the server 102 and forwards it to the client software on the user's mobile device 104. All communications are intermediated by the proxy 101. The proxy 101 can block or modify requests appropriately to convert a client web or networked application program into a read-only application. Each request is examined for user-generated content and blocked or, optionally, modified with a suitable block message, otherwise it is sent to its destination. A block message may indicate that the message has been blocked following company policy. The proxy 101 may be configured with rules that instruct the proxy 101 on how to handle messages that are to be blocked or messages that cause block messages to be sent to the client device 104.

3. Proxy Operation

In an embodiment, access to the web client application may be restricted via a login process. The client device 104 may engage the server 102 with the login process using a standard such as the Security Assertion Markup Language (SAML), etc. In another embodiment a delegated authentication process may be performed by the proxy as described in U.S. patent application Ser. No. 15/098,312, entitled "Secure User Credential Access System," also owned by the Applicant and which is hereby incorporated by reference for all purposes as if fully set forth herein.

Figure 2:
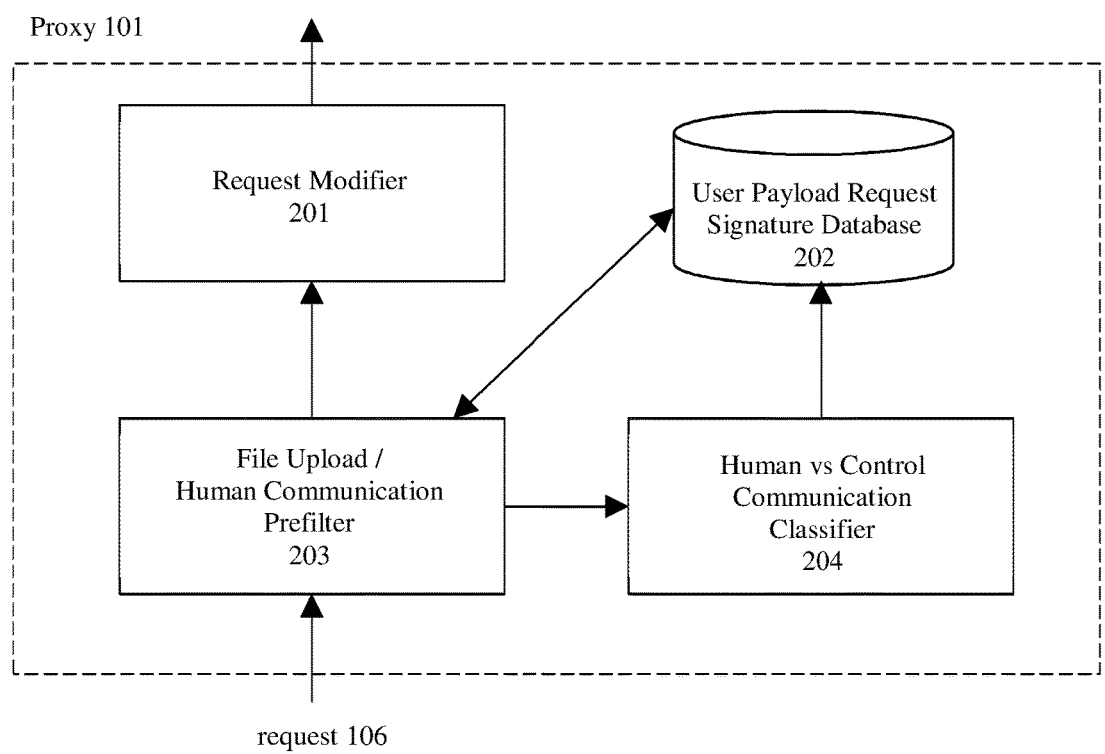
FIG. 2 illustrates a network proxy, according to an embodiment of the invention.
Figure 3:
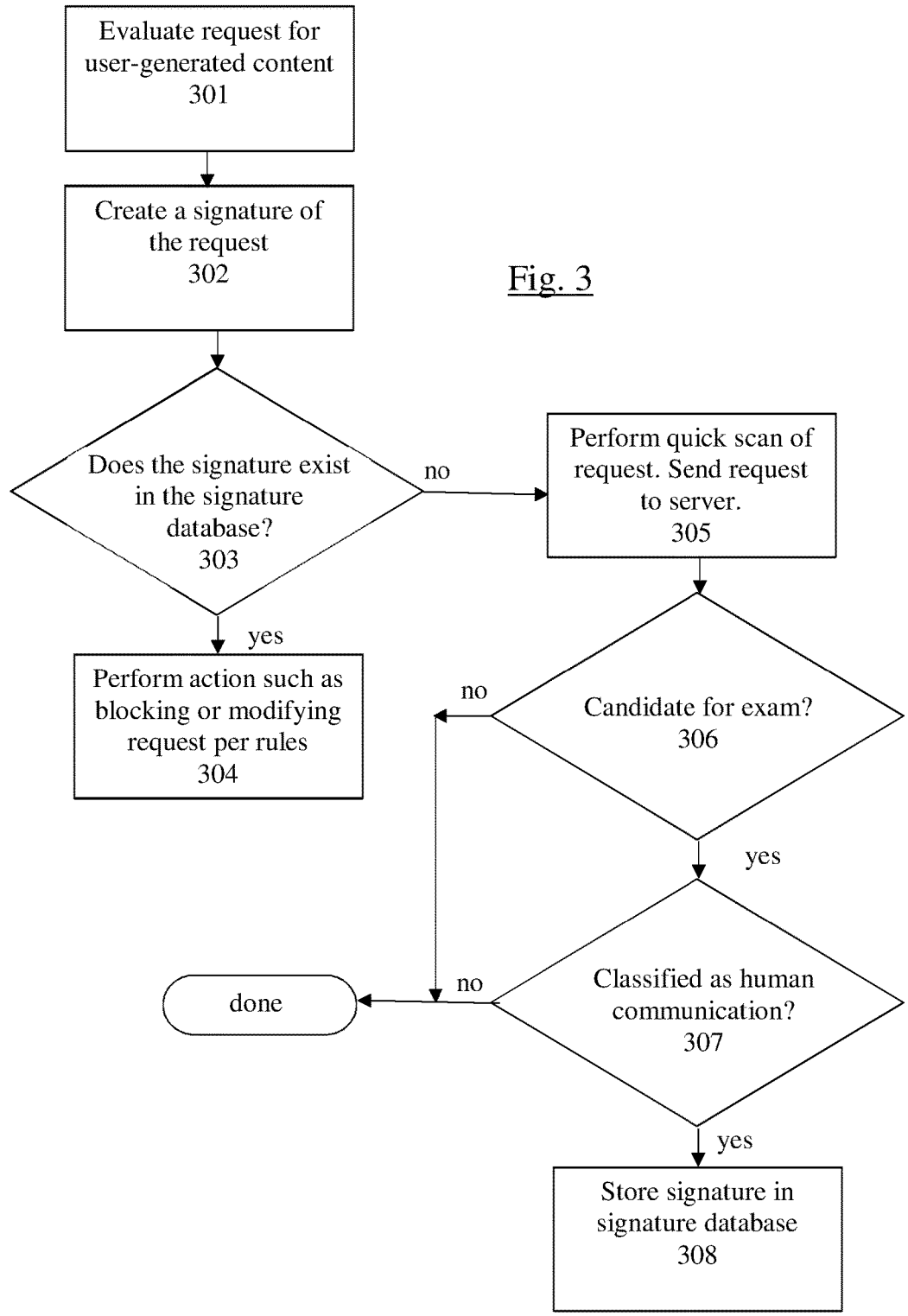
FIG. 3 illustrates a flow chart describing analyzing a request message, according to an embodiment of the invention.

Referring to FIGS. 1-3, in an embodiment, after a user, via the client device 104, is authenticated for access to the web client application or in the event that no authentication is needed, the user begins interacting with the server 102 via the client device 104. The proxy 101 is located in the cloud where all of the requests from client devices in the corporate-controlled infrastructure are routed. As the user is interacting with the web client application, the web client application sends requests to the server 102. For example, when the user inputs information into entry fields in a user interface for a web client application, a request is sent to the server 102 from the client device 101 that contains the information entered by the user. This information may be sensitive information that contains user-specific information (e.g., credit card information, home address, phone numbers, social security number, etc.) or company sensitive information (e.g., technology development, new product information, customer names, revenue information, etc.). In another example, the user may upload a file to a social networking site. The file may contain sensitive corporate information. These types of information should not be allowed to exit the corporate-controlled infrastructure. Further, company policy may allow and/or encourage access to web sites, but only if no information input or data transfer is performed.

Requests sent by the client device 104 in response to user input are routed to the proxy 101. The proxy 101 acts as the gatekeeper for outgoing traffic for the corporate controlled infrastructure. The proxy 101 automatically determines requests and methods that are being used to upload user data and distinguishes between uploaded "control" inputs and "user data" inputs from the client device. Requests 106 enter the proxy 101 and are passed through a human communication prefilter and classifier 203. Each request is examined by the human communication prefilter 203 and subject to analysis for classification as human communication by the human vs control communication classifier 204. Requests that carry human communication payloads are typically composed of at least two parts: the user-generated content and the packaging and control information created by the application to indicate how to process the human communication content. The packaging and control information is referred to herein as "invariant part(s)". Requests that carry user-generated content payloads have the invariant parts converted into signatures and stored in the request signature database 202. These signatures are then used to determine whether requests should be blocked or modified.

In an embodiment, user-generated content that is being transferred in a request is identified using file signatures for file uploads and natural language processing for textual content. Uploaded files can be identified by specific patterns in the data and accompanying header declarations that indicate a file package. Human communication prefilter 203 evaluates the request for user-generated content 301 by creating a request signature comprised of the invariant parts of the request and checks if the request signature is found in the user payload request signature database 202, 303. The invariant parts will be found in all instances of the requests. Request signatures may include any of: the destination domain, URI, parameter names, header keys, keys in standard data container formats such as multipart forms, json, or xml data, etc.

If a matching signature is found, then human communication prefilter 203 instructs the request modifier 201 to perform the configured action to: block the request, modify all or part of the request with a blocked message, redact all or part of the request, mask parts of the content, encrypt the user-generated content, etc., 304. A block message may be sent by substituting all or part of the user-generated content with a configured block message or by the proxy 101 directly responding with an error code (e.g., 403 forbidden for web traffic, etc.) without forwarding the request to the application. A redacted, masked, or encrypted request may have the user-generated content all or partially redacted, masked, or encrypted before the request is sent to the server. The configured action may be defined, for example, by one or more rules or policies defined for the particular signature, by one or more rules or policies defined for a type of request, a generally defined action, etc. The one or more rules or policies may be conditioned upon patterns (e.g., patterns of sensitive data such as credit card numbers, patient record identifiers, etc.) in order to detect certain classes of user input. The modification of the human-payload section of the request may, for example, replace all or part of the user's text entry in the request with another message, for example, to one that states, "Company policy does not allow data entry to this web site." In other examples, the text could also be x'd out or masked where the text is replaced with x's, blanks, dashes, etc., or if a credit card number was entered, the last four (or any appropriate number and/or position) digits could be replaced with x's, blanks, dashes, etc. In the case of a blocked message, the proxy 101 sends the blocked message to the client device and the server does not receive the original request. When the client device receives the blocked message, it may display the appropriate message for standard blocked messages to the user. In the case of the modified human-payload section of the request, the server receives the request and cause the display of the text contained in the modified human-payload section of the request. The user will see all or a portion of the text displayed in the text entry field in the web client application user interface that the user entered text into instead of what the user typed into the entry field.

If no matching signature is found, the human communication prefilter 203 performs a quick scan of the request 305 to decide if the request should be subject to further examination 306 by the human vs. control communication classifier 204. A quick scan may consist of scanning for the most common anaphoric words, articles, prepositions, etc., in various languages. These words could indicate the possibility of "human content" existing but may be too weak a classifier for a definitive classification. For example, the words in English it could be words such as: "to", "is", "be", etc. The request is allowed to proceed to 305. If the request is a candidate for examination, it is queued for further detailed analysis. Allowing the request to proceed in this manner means that some requests may go through while the system learns that a request carries user content, after which the signature will be inserted in the signature database and blocked or modified as configured. This also allows the proxy 101 to rapidly adapt to changes in web client applications without human intervention. Alternatively, requests could be buffered until a detailed classification is obtained.

The human vs control communication classifier 204 determines if the request is a user file upload or textual communication that can be classified as human communication with high confidence 307. Classification of textual content proceeds by searching for grammatical chunks of text that make significant use of anaphora and/or common verbs that are unlikely to be found in machine-generated communications. For example, segments such as, "he has to go to," or "उसको वहां से ले आओ," or "他去了那里," are unlikely to occur in machine-to-machine communications and are classified as snippets of human communication. This is because it is too complicated for machines to resolve anaphoric references and it is much easier for machines to refer to objects using explicit IDs. If diverse "human" utterances are found against the same request signature multiple (e.g., greater than a specified threshold, greater than a constant threshold, etc.) times, the request is classified as a human upload request 307.

If the request is classified as user payload (or "human") multiple (e.g., greater than a specified threshold, greater than a constant threshold, etc.) times, its signature is stored in the user payload request signature database 202, 308. This step may be used for URL pattern generalization to enable generic matching of a class of URLs. For example, if text is uploaded using URLs such as, "webpoolb120a23.service.domain.com//ucwa/oauth/v1/applications/113666269969/batch", "webpoolb120a24.service.domain.com//ucwa/oauth/v1/applications/1124875843/batch", etc., the URL would be generalized to a generic regex term, for example, "web[-%\w]+\.service\.domain\.com//ucwa/oauth/v1/applications/\d+/batch". This takes care of instances where portions of the URL can charge in each instance, but the essential purpose is the same, e.g., a user comment is contained in the URL, etc.

In an embodiment, the system also learns specific exception patterns corresponding to logins, searches, file download requests, etc. These are performed by examining the uploaded data and the corresponding response. If the transaction matches aspects of these learned exception conditions, they are recorded for exclusion from the blocking logic. In an alternate embodiment, manually specified exception patterns may be used in conjunction with automatically learned ones.

In an embodiment, the user payload request signature database 202 may be seeded from data from other proxies that have evaluated the same or similar requests for a particular web client application. Because the proxy service can be a cloud service, one or more proxies may be servicing one corporate client while one or more other proxies may be servicing another corporate client. The user payload request signatures are specific to a particular web client application and not the corporate client. Thus, the user payload request signatures may be shared among proxy servers that serve different corporate clients, where the corporate clients have access to the same web client application(s) (e.g., social networking sites, business applications, etc.). The proxies may communicate with each other to share the user payload request signatures.

3.1. Deep Analysis of Text for Human Versus Machine Classification

Figure 4:
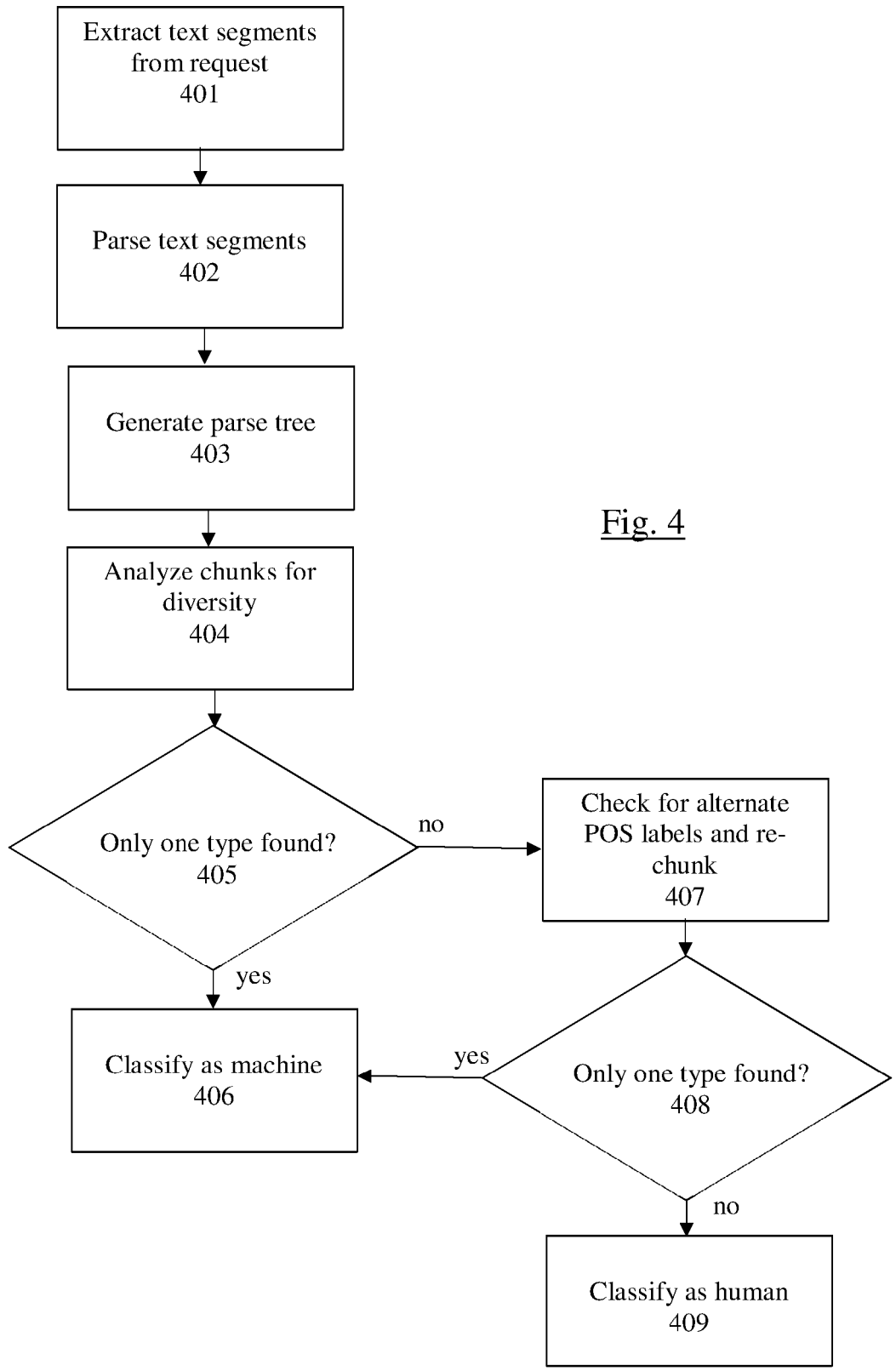
FIG. 4 illustrates a flow chart describing a deep analysis of a structure of a payload of a request message, according to an embodiment of the invention.

Referring to FIG. 4, human vs control communication classifier 204 performs a deep analysis of textual content found in a request to determine whether the textual content is human originated text or material versus content created by machines. The classification process begins by extracting text segments from payload containers (e.g., multipart forms, json, xml, etc.) 401. The request is parsed for the payload portion of the request. The payload is scanned for textual portions using natural language recognition or other textual recognition process, such as regular expressions, etc.

The textual portion is parsed for sentences. The text in each sentence is tokenized and POS (part of speech) tagged 402.

The text is segmented into chunks and a shallow parse tree is generated for each sentence 403. The parse tree allows the system to evaluate the grammatical structure of the chunks of the sentence in order to determine if it was user-created content. The chunks are then analyzed to determine the diversity of tags associated with each chunk and the POS tags of the constituents of each chunk 404.

If there is only one type of chunk tag 405, the request is classified as machine-generated 406. Otherwise, any chunks that have a single POS tag with the chunk, is rechunked by locally analyzing the surrounding text to check for alternate POS labels based on the immediate context 407. If only one type of chunk tag is found 408, the request is classified as machine originated 406, otherwise the request is classified as human originated 409.

For example, in an embodiment, the phrase "Physical activities: running, skipping, jumping" is comprised of the chunks "Physical activities" (noun phrase), "running" (noun phrase), "skipping" (noun phrase), "jumping" (noun phrase). The gerunds among the chunks: "running", "skipping", and "jumping", could be mis-tagged as verb phrases due to the context-aware nature of a chunking algorithm. This mis-tagging would lead to the sentence being wrongly labelled as human originated. To account for this, "running", "skipping", and "jumping", are re-chunked as individual tokens and then the sentence would be correctly classified as machine originated.

In an example, a user via client device 104 logs onto a social networking site operating through server 102. The login request is sent from the client device 104 to the server 102. The login request may use a standard such as the Security Assertion Markup Language (SAML), etc. The proxy 101 may route the login request to the server 102, but cannot see the contents of the request due to the security standard used. Once the login process is complete, the user interacts with the web client application of the social networking site.

Company policy may allow access to this social networking site but does not allow data entry or uploads to occur. The user may attempt to upload a photo or file or enter text into the web client application in order to post to the social networking site. As the user enters text into the web client application, the web client application creates a request, each request is sent to the proxy 101. The proxy 101 receives the request and evaluates the request to determine if the content in the request is human-generated or machine-generated. The proxy 101 creates a signature of the invariant portion of the request. The signature is compared to the signatures stored in a request signatures database 202.

If the signature exists in the database, the proxy classifies the request as human-generated. The proxy 101 then performs a configured action in response to the type of request. The action may be to block the request, modify all or part of the request with a blocked message, redact all or part of the request, mask parts of the content, encrypt the user generated content, etc. In an embodiment, the proxy 101 may send a response to the request with a blocked message (e.g., returning an error code directly to the web client application, such as: a 500, server denied code, etc.) to the client device or send a modified request to the server. The modified request may, for example, replace all or part of the user's text entry in the request with another message, for example, to one that states, "Company policy does not allow data entry to this web site." In the case of a blocked message, the proxy 101 sends the blocked message to the client device and the server does not receive the original request. When the client device receives the blocked message, it may display the appropriate message for standard blocked messages to the user. In the case of a modified request, the server receives the request and displays the text contained in the modified request. The user will see the text displayed on the web client application user interface.

If the signature does not exist in the database, proxy 101 performs a preliminary scan of the request to determine if the request possibly contains textual content that can be evaluated. If the request does have textual content that can be evaluated, the request is queued for further analysis. In an embodiment, the request is sent to the server to avoid delays waiting for the further analysis of the request to complete. In another embodiment, the request is held until the further analysis has been completed.

Proxy 101 then evaluates the textual content in the request to determine if the content is a candidate for further analysis. The content is parsed into grammatical chunks of text. The chunks are searched for text that makes significant use of anaphora and/or common verbs that are unlikely to be found in machine-generated communications. If the chunks are found to have multiple (e.g., greater than a specified threshold, greater than a constant threshold, etc.) occurrences of such anaphora and/or common verbs, then the request is classified as human-generated and the request's signature is saved in request signatures database 202. Otherwise, the request is considered machine-generated and no action is performed.

In an example embodiment, a POST request is received by the proxy:
https://web53.somedomain.com/applications/113666269969/batch,
With the POST body containing a json such as:
{"Tool":"html5"
,"Method": "Threaded",
"Message": "would you like to get some pizza for lunch?",
"Overwrite":false}

In this example, the quick scan performed in 302 would find common words such as "you", "to", "would", "get", and "for", and would flag the POST for further analysis. Further analysis would identify the "Message" key in the json to be the carrier of "human" input by virtue of phrases such as "would you like to get" and the grammatical structure of the parsed sentence. The learnt template at this time would be: (POST,. "web53.somedomain.com/applications/113666269969/batch", JSON(["Message"]), indicating that a POST to the specified URL pattern carries user input in json form as the value of the top-level key named "Message". The proxy may later receive a different POST request:
https://web65.somedomain.com/applications/427359/batch,
With the POST body containing a json such as:
{"Tool":"html5"
,"Method": "Threaded",
"Message":"it is a cold day on the west coast today",
"Overwrite":false}

In this case, as before, the template learnt would be (POST,. "web65.somedomain.com/applications/427359/batch",. JSON(["Message"]). The template generalizer would combine to two patterns above to:
(POST,. "web\d+.somedomain.com/applications/\d+/batch",. JSON(["Message"])

The template would apply generically to all messages that match the generalized pattern. The pattern would be released as learnt after a certain number/threshold (e.g., the value may be configurable in the rules/policies, a configured constant, calculated value based on observed patterns, etc., other determined value, etc.) of distinct messages are observed for the "Message" key in the generalized template that are classified as human.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

4. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
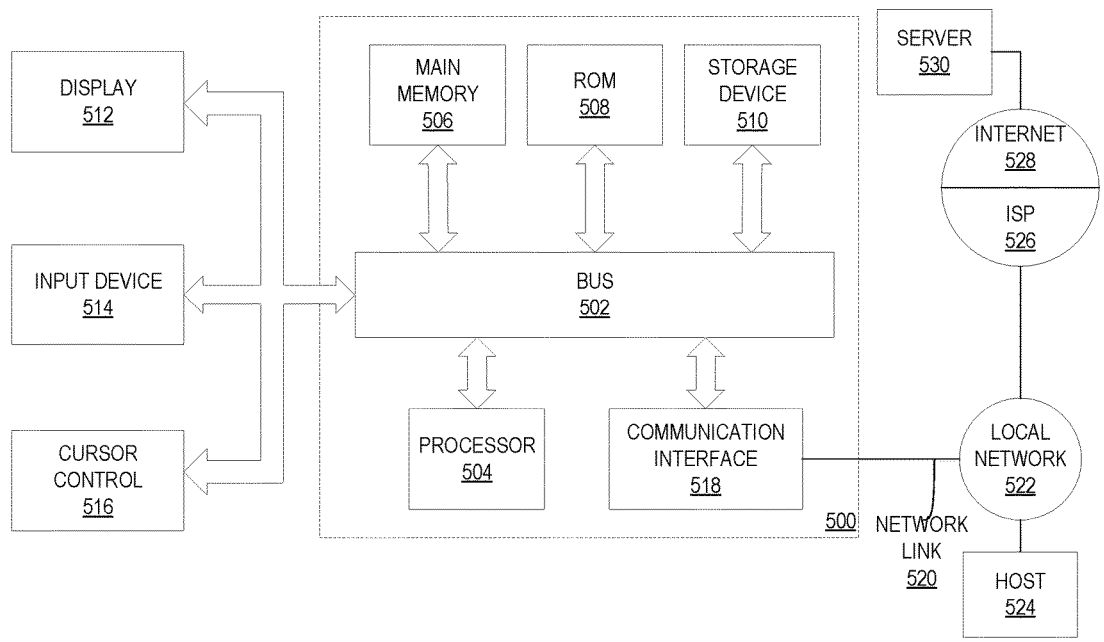
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically converting remote applications into read-only applications, comprising:
    receiving, by a first device, an application request message from a client device across a network, the application request message including a payload portion, the application request message destined for a remote application server;
    analyzing the application request message to determine whether the application request message is human-generated or machine-generated;
    performing one or more actions based on a determination that the application request message is human-generated, the one or more actions include modifying or blocking all or a portion of the application request message;
    forwarding the application request message to the remote application server based on a determination that the application request message is machine-generated.

2. The method as recited in claim 1, wherein the analyzing the application request message further comprises:
    segmenting the payload portion into one or more chunks;
    parsing text in the one or more chunks;
    determining parts of speech in each chunk of the one or more chunks;
    classifying the application request message as human-generated when the number of parts of speech that appear in the one or more chunks are above a certain threshold;
    storing a signature of the application request message in a signature database.

3. The method as recited in claim 1, wherein the analyzing the application request message further comprises:
    creating a signature for the application request message;
    comparing the signature to signatures stored in a signature database;
    classifying the application request message as human-generated when a matching signature in the signature database is found.

4. The method as recited in claim 1, wherein the analyzing the application request message further comprises:
    creating a signature for the application request message using an invariant portion of the application request message;
    comparing the signature to signatures stored in a signature database;
    classifying the application request message as human-generated when a matching signature in the signature database is found.

5. The method as recited in claim 1, wherein the analyzing the application request message further comprises:
    creating a signature for the application request message;
    comparing the signature to signatures stored in a signature database;
    classifying the application request message as human-generated when a matching signature in the signature database is found; and
    when a matching signature in the signature database is not found:
        parsing text in the one or more chunks;
        determining parts of speech in each chunk of the one or more chunks;
        classifying the application request message as human-generated when the number of parts of speech that appear in the one or more chunks are above a certain threshold; and
        storing a signature of the application request message in the signature database.

6. The method as recited in claim 1, wherein the analyzing the application request message further comprises:
    creating a signature for the application request message using an invariant portion of the application request message;
    comparing the signature to signatures stored in a signature database;
    classifying the application request message as human-generated when a matching signature in the signature database is found; and
    when a matching signature in the signature database is not found:
        parsing text in the one or more chunks;
        determining parts of speech in each chunk of the one or more chunks;
        classifying the application request message as human-generated when the number of parts of speech that appear in the one or more chunks are above a certain threshold; and
        storing a signature of the application request message in the signature database.

7. The method as recited in claim 1, wherein the first device is a proxy server.

8. The method as recited in claim 1, wherein the one or more actions comprises blocking the message and sending an error message to the client device.

9. The method as recited in claim 1, wherein the one or more actions comprises blocking the message by replacing all or a portion of textual content in the payload portion of the application request message with another textual message and sending the message to the client device.

10. The method as recited in claim 1, wherein the one or more actions comprises replacing all or a portion of textual content in the payload portion of the application request message with another textual message before sending the message to the remote application server.

11. The method as recited in claim 1, wherein the one or more actions comprises redacting all or a portion of content in the payload portion of the application request message before sending the message to the remote application server.

12. The method as recited in claim 1, wherein the one or more actions comprises masking all or a portion of content in the payload portion of the application request message before sending the message to the remote application server.

13. The method as recited in claim 1, wherein the one or more actions comprises encrypting all or a portion of content in the payload portion of the application request message before sending the message to the remote application server.

14. The method as recited in claim 1, wherein the one or more actions are specified in one or more rules associated with a type of the application request message.

15. One or more non-transitory computer-readable storage media, storing one or more sequences of instructions, which when executed by one or more processors cause performance of:
   receiving, by a first device, an application request message from a client device across a network, the application request message including a payload portion, the application request message destined for a remote application server;
   analyzing the application request message to determine whether the application request message is human-generated or machine-generated;
   performing one or more actions based on a determination that the application request message is human-generated, the one or more actions include modifying or blocking all or a portion of the application request message;
   forwarding the application request message to the remote application server based on a determination that the application request message is machine-generated.

16. The one or more non-transitory computer-readable storage media as recited in claim 15, wherein the analyzing the application request message further comprises:
   segmenting the payload portion into one or more chunks;
   parsing text in the one or more chunks;
   determining parts of speech in each chunk of the one or more chunks;
   classifying the application request message as human-generated when the number of parts of speech that appear in the one or more chunks are above a certain threshold;
   storing a signature of the application request message in a signature database.

17. The one or more non-transitory computer-readable storage media as recited in claim 15, wherein the analyzing the application request message further comprises:
   creating a signature for the application request message using an invariant portion of the application request message;
   comparing the signature to signatures stored in a signature database;
   classifying the application request message as human-generated when a matching signature in the signature database is found.

18. An apparatus, comprising:
   one or more processors; and
   a memory storing instructions, which when executed by the one or more processors, causes the one or more processors to:
      receiving, by a first device, an application request message from a client device across a network, the application request message including a payload portion, the application request message destined for a remote application server;
      analyzing the application request message to determine whether the application request message is human-generated or machine-generated;
      performing one or more actions based on a determination that the application request message is human-generated, the one or more actions include modifying or blocking all or a portion of the application request message;
      forwarding the application request message to the remote application server based on a determination that the application request message is machine-generated.

19. The apparatus as recited in claim 18, wherein the analyzing the application request message further comprises:
   segmenting the payload portion into one or more chunks;
   parsing text in the one or more chunks;
   determining parts of speech in each chunk of the one or more chunks;
   classifying the application request message as human-generated when the number of parts of speech that appear in the one or more chunks are above a certain threshold;
   storing a signature of the application request message in a signature database.

20. The apparatus as recited in claim 18, wherein the analyzing the application request message further comprises:
   creating a signature for the application request message using an invariant portion of the application request message;
   comparing the signature to signatures stored in a signature database;
   classifying the application request message as human-generated when a matching signature in the signature database is found.

* * * * *